United States Patent [19]
Bartlett

[11] Patent Number: 5,215,178
[45] Date of Patent: Jun. 1, 1993

[54] SAFETY VALVE FOR DISCHARGE CHUTES ON CEMENT MIXER

[75] Inventor: William P. Bartlett, Dodge Center, Minn.

[73] Assignee: McNeilus Truck and Manufacturing, Inc., Dodge Center, Minn.

[21] Appl. No.: 803,513

[22] Filed: Dec. 9, 1991

Related U.S. Application Data

[62] Division of Ser. No. 674,081, Mar. 25, 1991, Pat. No. 5,107,679.

[51] Int. Cl.$^5$ .............................................. F16K 17/24
[52] U.S. Cl. ................................... 193/5; 60/481; 91/471; 137/460; 137/498; 193/10
[58] Field of Search ............... 137/498, 503, 504, 517, 137/460, 1; 60/481; 193/10, 5; 91/471

[56] References Cited

U.S. PATENT DOCUMENTS

| | | | |
|---|---|---|---|
| 2,093,015 | 9/1937 | Madden | 137/498 X |
| 2,821,209 | 1/1958 | Waterman | 137/498 |
| 2,960,109 | 11/1960 | Wilson | 137/517 |
| 3,228,658 | 1/1966 | London | 60/481 X |
| 4,276,975 | 7/1981 | Jenkins | 193/10 |
| 4,341,235 | 7/1982 | Nord | 137/498 X |
| 4,347,867 | 9/1982 | Peters | 137/498 X |
| 4,785,847 | 11/1988 | Steer et al. | 137/508 X |
| 4,867,198 | 9/1989 | Faust | 137/504 X |
| 4,870,889 | 10/1989 | Wall | 137/508 X |

FOREIGN PATENT DOCUMENTS 288716  11/1915  Fed. Rep. of Germany ...... 137/498

Primary Examiner—Stephen M. Hepperle
Attorney, Agent, or Firm—Haugen and Nikolai

[57] ABSTRACT

A safety valve which prevents the discharge chute from rapidly falling due to a sudden loss of hydraulic fluid pressure. The valve is located between the chute lift cylinder port and hydraulic system hose. The valve is actuated when the flow leaving the chute lift cylinder exceeds a predetermined flow. The valve immediately stops the hydraulic fluid from leaving the chute lift cylinder maintaining the position of the discharge chute.

3 Claims, 2 Drawing Sheets 5,215,178

SAFETY VALVE FOR DISCHARGE CHUTES ON CEMENT MIXER

This is a divisional of copending application Ser. No. 07/674,081, now U.S. Pat. No. 5,107,679, filed on Mar. 25, 1991.

BACKGROUND OF THE INVENTION

This invention relates generally to a safety valve for use in hydraulic line system which prevents flow of a working hydraulic fluid above a specific flow rate and more particularly to a safety valve which screws directly into the chute lift cylinder port and the chute lift hydraulic hose of a ready-mix concrete truck. The delivery chute on the rear of ready-mix concrete trucks is conventionally hydraulically raised and lowered. In normal operating use, the chute is often full of concrete and held in position by a hydraulic cylinder.

The hydraulic hose connected to the hydraulic cylinder is subject to wear, damage and deterioration by the nature of its application. Frequent inspections for cuts, abrasions, wear, acid wash damage, etc. are necessary to prevent hose failure during operation. Failure may occur if the hose is not regularly inspected or from damage to the hose occurring on the job. Workers tugging and pulling on a heavy, full concrete chute can cause pressure spikes in the chute life hydraulic hose. Previously damaged hose may potentially break from the pressure spikes. A broken hose results in a sudden pressure loss and the fluid flow is no longer controlled. The sudden loss of pressure causes hydraulic fluid to rapidly flow from the hydraulic cylinder, resulting in the chute crashing downward and potentially seriously injuring workers.

What is needed is a way to prevent the chute from crashing downward due to a sudden loss of hydraulic fluid pressure.

SUMMARY OF THE INVENTION

The invention is a safety valve which prevents the chute from rapidly falling due to a sudden loss of hydraulic fluid pressure. The safety valve screws directly onto the chute lift cylinder port. The chute lift hydraulic cylinder hose fitting then screws directly into the safety valve. Normal hydraulic fluid flow coming out of the chute lift cylinder is less than three gallons per minute. The gallons per minute flow increases dramatically should the hydraulic hose break. The safety valve is actuated any time the flow leaving the chute lift cylinder exceeds a predetermined value, e.g., approximately four gallons per minute. The safety valve immediately blocks further hydraulic fluid from leaving the chute lift cylinder and, thus, the chute cannot fall.

The principle object of this invention is to provide a safety valve to prevent the rapid falling of a hydraulically held concrete chute due to sudden loss of hydraulic pressure because of a hydraulic line failure.

Another object is to provide a safety valve that directly mounts to the chute lift cylinder on one end and the hydraulic hose on the opposite end.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
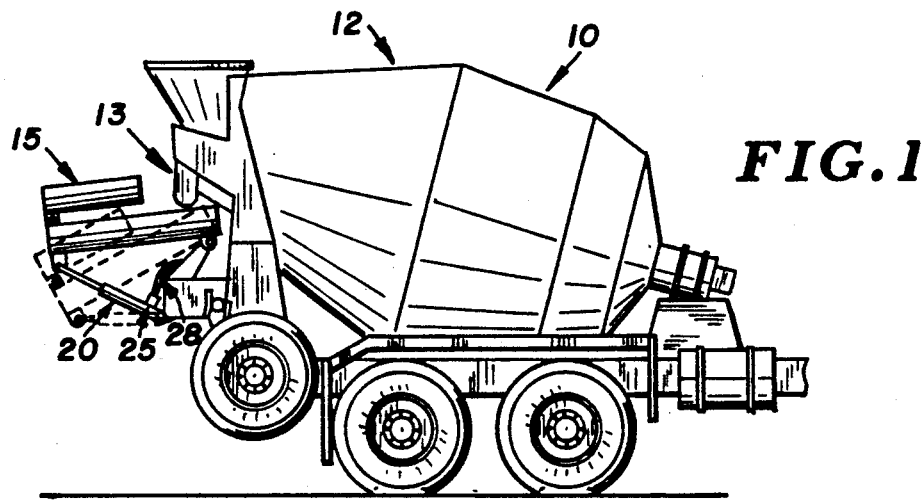
FIG. 1 is a partial side view of a ready mix concrete truck with an extended concrete chute incorporating the present invention.

As shown in FIG. 1, a work-type vehicle, namely a ready-mix concrete truck, is indicated generally by 10. It includes a rotatable mixer drum 12. Cement or concrete is emptied through discharge spout 13 into a discharge chute 15. This discharge chute 15 is used to cause the concrete to flow into a bucket, wheel barrel, or to a space defined by erected concrete forms. Discharge chute 15 is positioned by means of the chute lift hydraulic cylinder 20. Workers also pull and tug on the chute for lateral positioning thereof.

Figure 2:
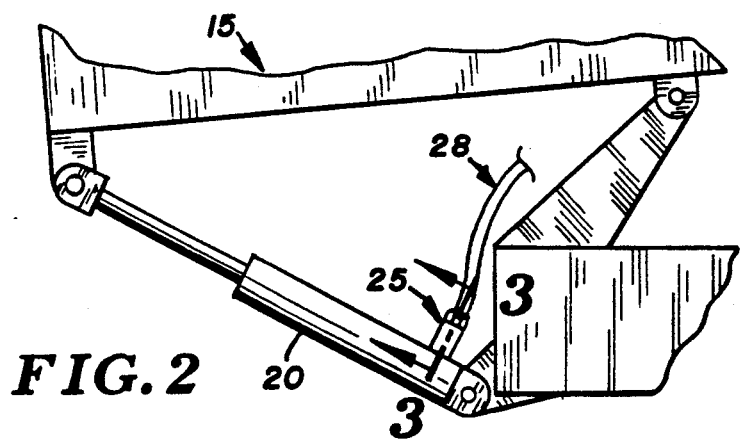
FIG. 2 is an enlarged view showing the invention in location between cylinder and hydraulic lines.

The present invention relates to a safety valve device 25 located between discharge chute cylinder 20 and hydraulic hose 28, as shown in FIG. 2. The safety valve 25 screws into the cylinder port (not shown) and the hydraulic hose 28 screws onto the opposite end. Controlled flow of the hydraulic fluid is from the hydraulic hose 28 into the cylinder 20.

Figure 3:
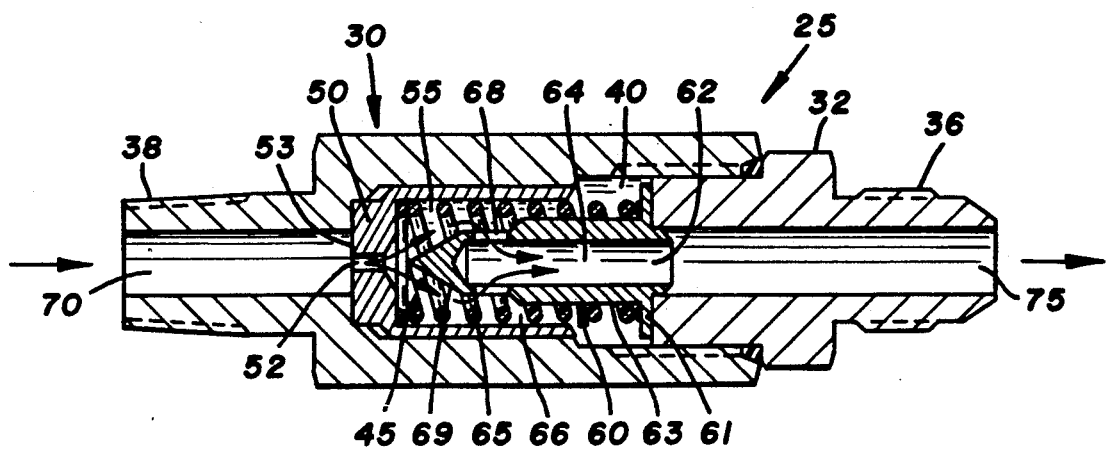
FIG. 3 is a cross sectional view taken along line 3—3 in FIG. 2 of the safety valve in the open position.
Figure 4:
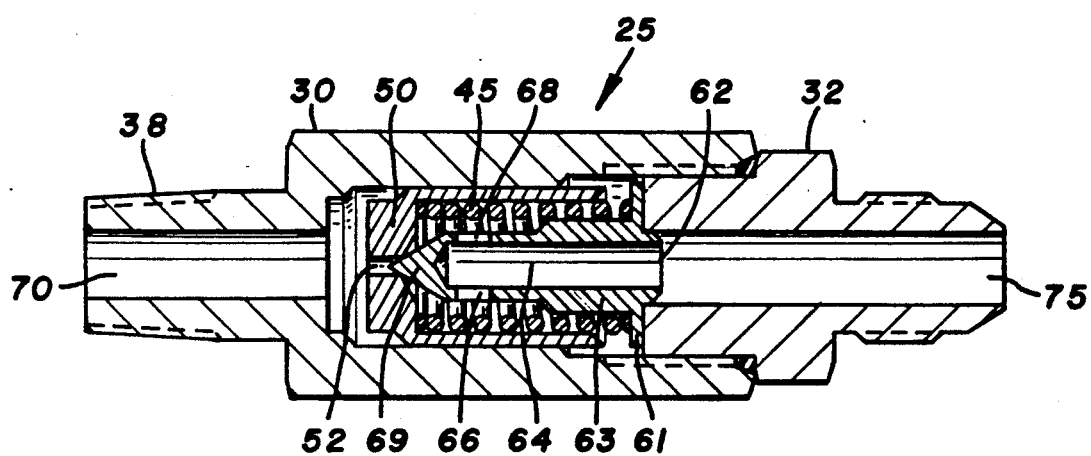
FIG. 4 is a cross sectional view taken along line 3—3 in FIG. 2 of the safety valve in the closed position.

As shown in FIGS. 3 and 4, the safety valve has a generally cylindrical body with two members: second body member 32 and first body member 30. Second body member 32 is attached to the hydraulic system port by threads, preferably J.I.C.-6,37° flare, 9/16-18 thread. These threads are shown at 36 on the system port end of the second body member 32. First body member 30 has a longitudinal bore 70 and a counterbore 40 which receives second body member 32 therein. Counterbore 40 also contains a moveable spool 50, compression spring 45 and a poppet 60 which will be described in further detail below. Threads, preferably ¼ NPTF type thread, are shown at 38 on the cylinder port end of the first body member 30 for attaching the safety valve to the hydraulic cylinder port.

The valve seat, poppet 60, in located in counter bore 40 and has a radial flange 61 and base containing opening 62. The flange 61 abuts second body member 32. The poppet 60 has a main cylindrical body 63 containing bore 64. The main body 63 tapers to section 65 containing two opposed ports 66 and 68. The two ports provide for fluid communication between bore 64 and the spool interior 55. Poppet 60 then tapers into conical end 69.

Spool 50 is located within first body member counterbore 40. The spool spring 45 is also located within counterbore 40. Spring 45 surrounds poppet 60 and extends into spool interior 55. FIG. 3 shows spring 45 during controlled flow. FIG. 4 shows spring 45 during restricted flow. Spring 45 provides the biasing means to urge spool 50 towards the poppet, blocking the fluid passageway as aperture 52 engages conical end 69 of poppet 60. Aperture 52 of spool 50 is of a diameter greatly smaller than the diameter of longitudinal bore 70. This aperture may, for example, be 0.125 inch. Spool interior 55 enlarges the fluid passageway allowing fluid communication with poppet ports 66 and 68.

The arrows in FIG. 3 show the flow of fluid from the cylinder through the valve. Hydraulic fluid flows from the cylinder port fluid inlet port into longitudinal bore 70, passes through spool aperture 52 into spool interior 55 around conical end 69 of poppet 60, and enters ports 66 and 68 as indicated. Fluid flows through bore 64 and then through the base opening 62, into longitudinal bore 75. The fluid then enters hydraulic hose 28.

Fluid will readily pass in either direction when the flow rate within the valve is less than a predetermined rate, e.g., approximately four gallons per minute. Flow rate less than the predetermined rate is the controlled flow rate of the hydraulic system. Spring 45 has sufficient stiffness such that fluid pressure on spool surface 53 as fluid enters spool aperture 52 is insufficient to cause spool 50 to move against the force of spring 45. When the flow rate from cylinder port exceeds approximately four gallons per minute, fluid pressure on spool surface 53 will increase as the fluid rushes to enter spool aperture 52. The increased fluid pressure on spool surface 53 causes spool 50 to move against the force of spring 45 toward poppet 60. Spool aperture 52 engages the conical end 65 of poppet 60 restricting fluid flow as shown in FIG. 4.

In the event the hydraulic hose breaks, the fluid pressure decreases rapidly on the system port end. Hydraulic fluid leaves the cylinder port at an increased flow rate to compensate for the sudden pressure decrease. Accordingly, fluid pressure increases against spool surface 53 as the hydraulic fluid enters the spool aperture 52 at an increased flow rate. When flow rate exceeds the predetermined flow rate, spool 50 moves against the force of spring 45 toward poppet 60. The flow is restricted as conical end 69 of poppet 60 engages aperture 52. Hydraulic fluid can no longer flow through the safety valve. Consequently, the hydraulic fluid remains in the hydraulic cylinder maintaining the concrete discharge chute's position.

It is understood that the above disclosure of the presently preferred embodiment is to be taken as illustrative of the invention. Furthermore, it is to be understood that those skilled in the art be capable of making modifications without departing from the true spirit and the scope of the invention.

What is claimed is:

1. A method for limiting the loss of hydraulic fluid from a hydraulic cylinder located on a redi-mix concrete truck of the type wherein the discharge chute is positioned by said hydraulic cylinder coupled in circuit with a hydraulic pump by a hose, but preventing said chute from dropping upon a failure of said hose, said method consisting of providing a flow operated poppet valve in series with said lift cylinder and a hydraulic fluid line, said flow operated poppet valve having a fluid passage therethrough and seated against an internal biasing spring located in said fluid passage, said valve being normally open when hydraulic fluid flow rate is below a predetermined value, said valve closing against said internal biasing spring to block fluid flow through said poppet valve, when the flow rate in said line exceeds said predetermined value.

2. The method as set forth in claim 1 wherein said a flow operated poppet valve closes to block hydraulic fluid from flowing therethrough when the flow rate exceeds approximately 4 gallons per minute.

3. The method as set forth in claim 1 wherein closure of said flow operated poppet valve is comprised of the steps:
   (a) increasing fluid pressure on a spool having an aperture for fluid flow;
   (b) reciprocating said spool towards a conical end of a valve seat;
   (c) engaging said conical end of said valve seat with said spool aperture;
   (d) blocking said spool aperture with said conical end of said valve seal; and
   (e) preventing fluid flow through said spool aperture.

* * * * *

UNITED STATES PATENT AND TRADEMARK OFFICE
CERTIFICATE OF CORRECTION

PATENT NO. : 5,215,178

DATED : June 1, 1993

INVENTOR(S) : William P. Bartlett

It is certified that error appears in the above-identified patent and that said Letters Patent is hereby corrected as shown below:

Column 4, line 38, please replace "seal" with --seat--.

Signed and Sealed this

Eighteenth Day of January, 1994

Attest:

BRUCE LEHMAN

Attesting Officer

Commissioner of Patents and Trademarks